(12) United States Patent
Kumar

(10) Patent No.: US 11,010,426 B2
(45) Date of Patent: May 18, 2021

(54) AUTOMATIC SELECTION OF VISUALIZATIONS REPRESENTING DATA BASED ON DATA ANALYSIS

(71) Applicant: Shashi Ranjan Kumar, Mumbai Maharashtra (IN)

(72) Inventor: Shashi Ranjan Kumar, Mumbai Maharashtra (IN)

( * ) Notice: Subject to any disclaimer, the term of this patent is extended or adjusted under 35 U.S.C. 154(b) by 72 days.

(21) Appl. No.: 16/291,196

(22) Filed: Mar. 4, 2019

(65) Prior Publication Data
US 2020/0285672 A1    Sep. 10, 2020

(51) Int. Cl.
   *G06F 16/901*    (2019.01)
   *G06F 16/906*    (2019.01)
   *G06F 16/9035*   (2019.01)
   *G06F 16/904*    (2019.01)

(52) U.S. Cl.
   CPC ........ *G06F 16/9024* (2019.01); *G06F 16/904* (2019.01); *G06F 16/906* (2019.01); *G06F 16/9035* (2019.01)

(58) Field of Classification Search
   CPC .... G06F 16/9024; G06F 16/26; G06F 16/904; G06T 11/20
   See application file for complete search history.

(56) References Cited

U.S. PATENT DOCUMENTS

| | | |
|---|---|---|
| 5,461,708 A | 10/1995 | Kahn |
| 8,984,433 B2 | 3/2015 | Grigoryev et al. |
| 9,299,173 B2 | 3/2016 | Rope et al. |
| 2011/0153643 A1* | 6/2011 | Haggie ............... G06Q 10/06 707/769 |
| 2012/0313949 A1* | 12/2012 | Rope ................ G06F 16/9038 345/440 |
| 2013/0176315 A1* | 7/2013 | Winkle ................ G06T 11/206 345/440 |
| 2016/0085835 A1* | 3/2016 | Wong ................. G06F 16/248 707/602 |

FOREIGN PATENT DOCUMENTS

| | | |
|---|---|---|
| CN | 106776769 A | 5/2017 |
| EP | 1220158 A2 | 7/2002 |

OTHER PUBLICATIONS

Converting Strings to datetime Objects written by Tom Jeon, Jun. 8, 2018 https://www.datacamp.com/community/tutorials/converting-strings-datetime-objects (Year: 2018).*
Padding A Time Series In R, by Irene Ros, Jun. 6, 2012 https://bocoup.com/blog/padding-time-series-with-r (Year: 2012).*
How to Sort Mixed Numbers and Text Using String Functions written by Andrew Roberts, Jul. 5, 2014 (Year: 2014).*

* cited by examiner

*Primary Examiner* — Hau H Hoang
(74) *Attorney, Agent, or Firm* — Belles Katz LLC

(57) ABSTRACT

A computer-implemented method is disclosed. The method comprises identifying one or more associations amongst a plurality of variables of a multidimensional multivariate dataset based on a data type of each of the plurality of variables. The method further comprises selecting one or more charts to be generated corresponding to the one or more associations based on at least one of the associations between the two or more variables, a number of the two or more variables, the data type of the two or more variables, and a number of rows of the dataset. The method further comprises generating an analysis report comprising the one or more charts.

18 Claims, 10 Drawing Sheets

Figure 4

AUTOMATIC SELECTION OF VISUALIZATIONS REPRESENTING DATA BASED ON DATA ANALYSIS

FIELD OF THE INVENTION

The present disclosure relates to analysing a multidimensional multivariate dataset, prioritizing useful insights derived from the multidimensional multivariate datasets, and automatically selecting visualizations, for example charts, representative of the useful insights.

BACKGROUND

Use of visualizations, such as charts, is considered to be one of the most effective ways of representing data. Such visualizations provide a comparative insight and a concise summary of the data in a lucid manner to an individual. As may be gathered, preparation of such visualizations is a skilled task. For instance, identification of type of chart and selection of appropriate variables for the chart may require domain expertise and accordingly, may require involvement of a skilled person. Furthermore, manual preparation of such charts is a cumbersome and effort-intensive process. As an example, in cases where the dataset is comprehensive, i.e., multidimensional and/or multivariate, and a plurality of charts is to be prepared, the preparation of the charts based on such a dataset may prove to be cumbersome and time-consuming task.

With the advent of technology, analytical tools have been developed that aid an individual to prepare the visualizations based on a given dataset. However, existing analytical tools still require multiple inputs from an individual to prepare the visualizations. For instance, the individual must select a type of the chart that is to be prepared and the variables that are required for the preparation of the chart. Plurality of user inputs may result in loss of standardization, consistency, and quality. For example, not all analysts would create a bubble chart when data has three related measures like sales, cost and profitability. Thus, such an insight would not be explored.

Furthermore, such existing tools are provisioned to prepare only one chart at a time. Thus, in cases where the individual may seek to prepare multiple charts, the individual must repeat the cycle of providing inputs for each of such charts. Again, this may prove to be a cumbersome task. Furthermore, post preparation of each of the charts, the individual has to manually export them to a document in order to prepare a collated report of such charts. As may be gathered, this increases the efforts involved in deriving insights from the multidimensional multivariate dataset.

Thus, there is a need for a solution that overcomes the above deficiencies.

SUMMARY

This summary is provided to introduce a selection of concepts, in a simplified format, that are further described in the detailed description of the invention. This summary is neither intended to identify key or essential inventive concepts of the invention and nor is it intended for determining the scope of the invention.

In an embodiment, a computer-implemented method is disclosed. The method comprises identifying, by a data analyzer, one or more associations amongst a plurality of variables of a multidimensional multivariate dataset based on a data type of each of the plurality of variables, where the data type is one of an attribute and a measure, where the attribute is non-measurable descriptive data and the measure is quantifiable data, where each association is between two or more variables, and where an association is one of a numerical association when the data type of the two or more variables is measure and a hierarchical association when the data type of the two or more variables is attribute. The method further comprises selecting, by the data analyzer, one or more charts to be generated corresponding to the one or more associations based on at least one of the association between the two or more variables, a number of the two or more variables, the data type of the two or more variables, and a number of rows of the dataset. The method further comprises generating, by a report generator, an analysis report comprising the one or more charts.

In another embodiment, a system is disclosed. The system comprises a data analyzer and a report generator. The data analyser is configured to identify one or more associations amongst a plurality of variables of a multidimensional multivariate dataset based on a data type of each of the plurality of variables, where the data type is one of an attribute and a measure, where the attribute is non-measurable descriptive data and the measure is quantifiable data, where each association is between two or more variables, and where an association is one of a numerical association when the data type of the two or more variables is measure and a hierarchical association when the data type of the two or more variables is attribute. The data analyzer is further configured to select one or more charts to be generated corresponding to the one or more associations based on at least one of the association between the two or more variables, a number of the two or more variables, the data type of the two or more variables, and a number of rows of the dataset. The report generator is configured to generate an analysis report comprising the one or more charts.

In yet another embodiment, a non-transitory computer-readable medium having embodied thereon a computer program for executing a method implementable by a computing device is disclosed. The method comprises identifying, by a data analyser, one or more associations amongst a plurality of variables of a multidimensional multivariate dataset based on a data type of each of the plurality of variables, where the data type is one of an attribute and a measure, where the attribute is non-measurable descriptive data and the measure is quantifiable data, where each association is between two or more variables, and where an association is one of a numerical association when the data type of the two or more variables is measure and a hierarchical association when the data type of the two or more variables is attribute. The method further comprises selecting, by the data analyzer, one or more charts to be generated corresponding to the one or more associations based on at least one of the association between the two or more variables, a number of the two or more variables, the data type of the two or more variables, and a number of rows of the dataset. The method further comprises generating, by a report generator, an analysis report comprising the one or more charts.

According to aspects of the present subject matter, a complete insight related to a multidimensional multivariable dataset is provided by creating different charts related to the multidimensional multivariable dataset in one go. The different charts are automatically organized in a report/document. Furthermore, the different charts that are needed to complete the insights are selected automatically. Thus, no input regarding the selection of the charts is required from the user. Additionally, the present subject matter provides for creating new charts/modify existing charts, if needed.

To further clarify advantages and features of the present invention, a more particular description of the invention will be rendered by reference to specific embodiments thereof, which is illustrated in the appended drawings. It is appreciated that these drawings depict only typical embodiments of the invention and are therefore not to be considered limiting of its scope. The invention will be described and explained with additional specificity and detail with the accompanying drawings.

BRIEF DESCRIPTION OF THE DRAWINGS

These and other features, aspects, and advantages of the present invention will become better understood when the following detailed description is read with reference to the accompanying drawings in which like characters represent like parts throughout the drawings, wherein:

FIG. 4 illustrates an example multidimensional multivariate dataset; and

Figure 1:
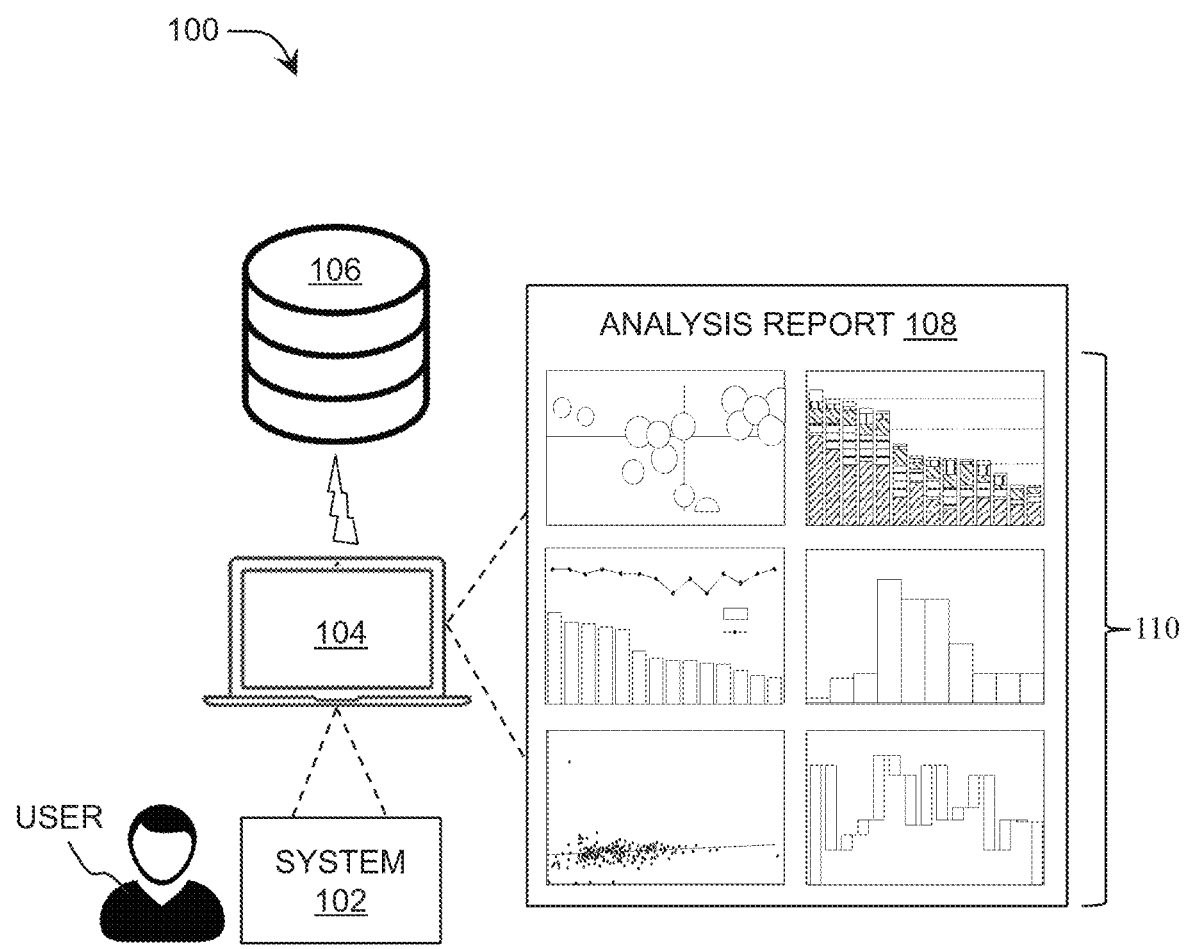
FIG. 1 illustrates an environment implementing a system for automatic selection of visualizations representing data based on data analysis, according to an embodiment of the present subject matter.

Further, skilled artisans will appreciate that elements in the drawings are illustrated for simplicity and may not have been necessarily been drawn to scale. For example, the flow charts illustrate the method in terms of the most prominent steps involved to help to improve understanding of aspects of the present invention. Furthermore, in terms of the construction of the device, one or more components of the device may have been represented in the drawings by conventional symbols, and the drawings may show only those specific details that are pertinent to understanding the embodiments of the present invention so as not to obscure the drawings with details that will be readily apparent to those of ordinary skill in the art having benefit of the description herein.

DETAILED DESCRIPTION OF FIGURES

For the purpose of promoting an understanding of the principles of the present subject matter, reference will now be made to the embodiment illustrated in the drawings and specific language will be used to describe the same. It will nevertheless be understood that no limitation of the scope of the present subject matter is thereby intended, such alterations and further modifications in the illustrated system, and such further applications of the principles of the invention as illustrated therein being contemplated as would normally occur to one skilled in the art to which the invention relates.

It will be understood by those skilled in the art that the foregoing general description and the following detailed description are explanatory of the present subject matter and are not intended to be restrictive thereof.

Reference throughout this specification to "an aspect", "another aspect" or similar language means that a particular feature, structure, or characteristic described in connection with the embodiment is included in at least one embodiment of the present invention. Thus, appearances of the phrase "in an embodiment", "in another embodiment" and similar language throughout this specification may, but do not necessarily, all refer to the same embodiment.

The terms "comprises", "comprising", or any other variations thereof, are intended to cover a non-exclusive inclusion, such that a process or method that comprises a list of steps does not include only those steps but may include other steps not expressly listed or inherent to such process or method. Similarly, one or more devices or sub-systems or elements or structures or components proceeded by "comprises . . . a" does not, without more constraints, preclude the existence of other devices or other sub-systems or other elements or other structures or other components or additional devices or additional sub-systems or additional elements or additional structures or additional components.

Unless otherwise defined, all technical and scientific terms used herein have the same meaning as commonly understood by one of ordinary skilled in the art to which this invention belongs. The system, methods, and examples provided herein are illustrative only and not intended to be limiting.

Embodiments of the present invention will be described below in detail with reference to the accompanying drawings.

FIG. 1 illustrates an environment 100 implementing a system 102 for automatic selection of visualizations representing data based on data analysis, according to an embodiment of the present subject matter. As shown in the figure, the system 102 may be implemented in a computing device 104. Examples of the computing device may include, but are not limited to, a workspace computer, a personal computer, a tablet, a smartphone, a laptop, and the like. In another example, the system 102 may be implemented in a server, for example, a cloud server, and services from the system 102 may be availed using the computing device 104.

According to aspects of the present subject matter, a user may use the system 102 for preparing one or more charts representative of data of a multidimensional multivariate dataset. In an example, the multidimensional multivariate dataset may be raw data and may be stored in a database 106. In an example, the database 106 may be provided in an internal storage of the computing device 104. In another example, the database 106 may be external to the computing device 104. In said example, the database 106 may be provided on external storage device or cloud storage, communicatively coupled to the computing device 104.

Referring to the preparation of the charts, upon obtaining the multidimensional multivariate dataset, the system 100 at first analyses the multidimensional multivariate dataset to identify one or more associations amongst a plurality of variables of the multidimensional multivariate dataset. The term association, as used herein, may be understood as a relationship between two or more variables of the multidimensional multivariate dataset. In an example, the system 100 identifies the associations based on a data type of each of the plurality of variables. The data type of the variables may be one of an attribute and a measure. The attribute may be understood as a non-measurable descriptive data, such as text, dates, numeric IDs, and the like. The measure may be understood as quantifiable data such as data representing target sales of different regions, actual sales of different regions, and the like. Most of the measures are Aggregatable i.e. they can be added like revenue. However, some of Measures are Non-Aggregatable like price, probabilities.

Non-Aggregatable measures are typically derived from numerical association of other Aggregatable measures.

Each of the associations is between two or more variables and may be one of a numerical association and hierarchical association. The numerical association may be understood as an association when the data type of the two or more variables is measure type. For example, an association between the target sales of different regions and actual sales of different regions is a numerical association. The hierarchical association may be understood as an association when the data type of the two or more variables is attribute type. As an example, an association between a state region and sub-regions of the state region is a hierarchical association.

Once the associations are identified, the system 100 then selects one or more charts to be generated corresponding to the one or more associations based on at least one of the association between the two or more variables, a number of the two or more variables, the data type of the two or more variables, and a number of rows of the dataset.

In an implementation, in a dataset where no association is found, the system 100 selects one or more charts to be generated based on at least one of the number of the two or more variables, the data type of the two or more variables, and the number of rows of the dataset.

As an example, the system 102 may identify a numerical association between three variables, say, target sales of a region, actual sales of region, and percentage accomplishment of sales, each having data type measure. In said example, the system 102 identifies that the association type is "numerical", number of variables is "3", and the data type of variables is "measure". The system 102 further determines the number of rows of the dataset. Based on aforesaid identifications and determination, the system 102 may select a bubble chart to represent the association between the three variables.

Once the system 102 selects the one or more charts to be generated, the system 102 then generates an analysis report comprising the one or more charts. An example analysis report 108 generated by the system 102 is shown in the FIG. 1. The analysis report 108 includes example charts 110.

As may be gathered from above, aspects of the present subject matter provide for automatic selection of visualizations representative of data based on data analysis. As the determination of the associations and selection of the charts related thereto is automatic, need for inputs from an individual, for example, a domain expert is averted. As a result, time and efforts involved in generation of such visualizations are greatly reduced. Other aspects of the present subject matter and advantages related thereto are explained in detail below.

Figure 2:
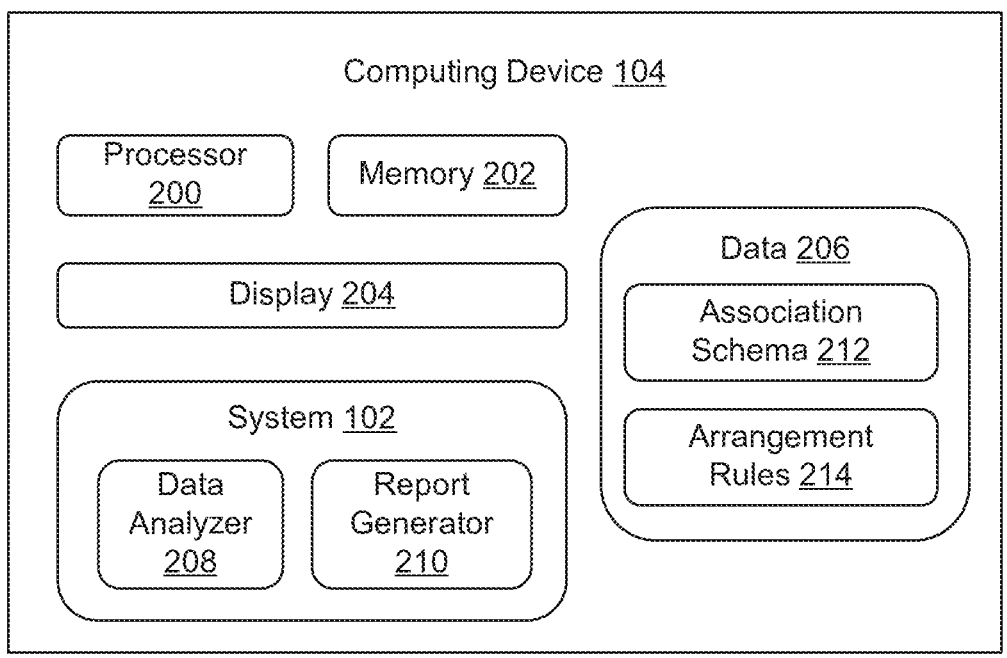
FIG. 2 illustrates a schematic block diagram of the computing device implementing the system, according to an embodiment of the present subject matter.

FIG. 2 illustrates a schematic block diagram of the computing device 104 implementing the system 102, according to an embodiment of the present subject matter. The computing device 104 includes a processor 200, memory 202, a display 204, the system 102, and data 206. The processor 200 can be a single processing unit or a number of units, all of which could include multiple computing units. The processor 200 may be implemented as one or more microprocessors, microcomputers, microcontrollers, digital signal processors, central processing units, graphical processing units, neural processing units, state machines, logic circuitries, and/or any devices that manipulate signals based on operational instructions. Among other capabilities, the processor 200 is configured to fetch and execute computer-readable instructions and data stored in the memory 202.

The memory 202 may include any non-transitory computer-readable medium known in the art including, for example, volatile memory, such as static random access memory (SRAM) and dynamic random access memory (DRAM), and/or non-volatile memory, such as read-only memory (ROM), erasable programmable ROM, flash memories, hard disks, optical disks, and magnetic tapes.

In an example, the system 102 includes a data analyzer 208 and a report generator 210. The data analyzer 208 and the report generator 210, amongst other things, include routines, programs, objects, components, data structures, etc., which perform particular tasks or implement data types. The data analyzer 208 and the report generator 210 may also be implemented as, signal processor(s), state machine(s), logic circuitries, and/or any other device or component that manipulate signals based on operational instructions. Further, the data analyzer 208 and the report generator 210 can be implemented in hardware, instructions executed by a processing unit, or by a combination thereof. The processing unit can comprise a computer, a processor, such as the processor 200, a state machine, a logic array or any other suitable devices capable of processing instructions. The processing unit can be a general-purpose processor which executes instructions to cause the general-purpose processor to perform the required tasks or, the processing unit can be dedicated to perform the required functions. In another aspect of the present subject matter, the data analyzer 208 and the report generator 210 may be machine-readable instructions (software) which, when executed by a processor/processing unit, perform any of the described functionalities.

The data 206 serves, amongst other things, as a repository for storing data processed, received, and generated by one or more of the processor 200, the data analyzer 208, and the report generator 210. Furthermore, the data 206 may an association schema 212 and arrangement rules 214. The association schema 212 may be understood as a library of predefined associations for different types of datasets. Similarly, the arrangement rules 214 may be understood as predefined rules based on which the charts are arranged in the analysis report.

In operation, the data analyzer 208 is configured to identify one or more associations amongst a plurality of variables of a multidimensional multivariate dataset based on a data type of each of the plurality of variables. For identifying the associations, the data analyser 208 may analyse the multidimensional multivariate dataset using the association schema 212. An example association schema is illustrated below.

Example Association Schema

Target*Achievement=Sales

Unit*Unit Price=Sales

Sales*Gross margin=Profit

Financial ratios like current ratio, Provision coverage ratio

Previous Time period Sales*(1+Growth)=Current Time period Sales

Sales*Contribution=sales of specific product

Market Size*Market Share=sales of specific company

Capital Deployed*Return on Investment=Profit

Acceleration*time=Velocity

As a part of analyzing, the data analyser 208 identifies the data type of each of the variables and accordingly determines the association between variables of similar data types. For instance, upon identifying the variables having data type measure, the data analyser 208 then determines one or more numerical association between the said variables. Similarly, upon identifying the variables having data type attribute, the data analyser 208 then determines one or more hierarchical association between the said variables. For determining the associations, as mentioned above, the data analyser 208 makes use of the association schema 212.

In an embodiment, besides analyzing the multidimensional multivariate dataset for identifying the associations, data analyser 208 is further configured to perform various operations in relation to the variables as described below.

In an example, when a variable is indicative of an integer, the data analyzer 208 is configured to ascertain whether a data type of the variable is one of the attribute or the measure. As an example, if the integer relates to dates, the data analyzer 208 ascertains that the data type of the variable is attribute. Similarly, if the integer is representing sales of a region, the data analyzer 208 ascertains that the data type of the variable is measure.

Based on the ascertaining, the data analyzer 208 is configured to perform one or more operations. For instance, when the data type of the variable is ascertained to be the attribute and the integer is indicative of an year, the data analyzer 208 is configured to convert the integer to a date. In another example, when the data type of the variable is ascertained to be the attribute and the integer is indicative of a unique identity, the data analyzer 208 is configured to convert the integer to text. In yet another example, when the data type of the variable is ascertained to be the measure, the data analyzer 208 may perform an operation, for example, a mathematical operation, based on the integer. As would be appreciated, the data analyzer 208 may perform other similar operations as well.

In an example, when a plurality of data entries related to a variable are indicative of text, the data analyzer 208 is configured to ascertain whether the plurality of data entries are indicative of time instances. If the data entries are indicative of time instances, the data analyzer 208 is configured to determine a format of the time instances based on an analysis of the plurality of data entries. Subsequently, the data analyzer 208 is configured to convert a format of the plurality of data entries to the determined format.

In an example, the data analyzer 208 may identify at least one numerical association and at least one hierarchical association in the multidimensional multivariate dataset. The numerical association may include at least one variable that may be a non-aggregatable measure. Furthermore, the hierarchical association may include an upper hierarchical variable and a lower hierarchical variable. Between two given variables, the upper hierarchical variable may be understood as a variable that encompasses the other variable or is a superset of the other variable. Similarly, the variable that is a subset of the other variable is referred to as the lower hierarchical variable. In the above example, the data analyzer 208 is configured to determine the non-aggregatable measure in respect of the upper hierarchical variable based on other variables of the at least one numerical association.

As an example, a multidimensional multivariate dataset is shown in Table 1 below. As shown, the multidimensional multivariate dataset may include entries related to area and a growth measure, such as sales/previous year sales. Furthermore, Region, the upper hierarchy of area is also tabulated corresponding to each area in the multidimensional multivariate dataset. According to aforementioned example, the data analyzer 208 determines one numerical association between the three measures (sales, previous year sales and Growth). Furthermore, the data analyzer 208 determines one hierarchical association between the two attributes, i.e., the Area and the Region. According to aspects described above, the data analyzer 208 determines the growth of the region as weighted average of area growth. In said case, the weights are previous year sales in accordance with determined numerical association. Thus, the data analyzer 208 calculates the non-aggregatable measure, i.e., growth of the region correctly.

TABLE 1

| Area | Region | Sales (Current Year) | Sales (Previous Year) | Growth |
|---|---|---|---|---|
| A1 | R1 | 10.0 | 9.7 | 3.1% |
| A2 | R1 | 15.0 | 14.3 | 5.3% |
| A3 | R1 | 20.0 | 19.0 | 5.3% |
| A4 | R2 | 25.0 | 23.8 | 5.3% |
| A5 | R2 | 30.0 | 27.0 | 11.1% |
| A6 | R2 | 35.0 | 34.3 | 2.0% |

Subsequent to the identification of the associations, the data analyzer 208 is configured to select one or more charts to be generated corresponding to the one or more associations based on at least one of the association between the two or more variables, a number of the two or more variables, the data type of the two or more variables, and a number of rows of the dataset.

Consider an example where a multidimensional multivariate dataset, amongst other entries, includes sales of 4 products for 2 regions. In such a case, the data analyzer 208 may identify the number of dimensions as 2 and the sales as single measure. The term dimension, as used herein, may be understood as similar to an attribute and may be used interchangeably. As may be understood, one dimension may have a plurality of attributes. For example, the dimension "geography" may have multiple attributes, such as Region, Area, Pin-code, and the like. Dimensions give context for a measure. Continuing with the above example, the data analyzer 208 selects a stack chart for the aforementioned dimensions.

In an example, the data analyzer 208 stores details related to the associations and the corresponding charts that are to be generated in the data 206. In an embodiment, the report generator 210 generates an analysis report comprising the one or more charts. In said embodiment, the report generator 210 generates the analysis report based on the details stored in the data 206.

In an example, the report generator 210 is configured to determine an order of presentation of the one or more charts in the analysis report based on a predefined set of rules, such as the arrangement rules 214. Based on the determined order, the report generator 210 arranges the charts in the analysis report.

Besides automatically preparing the charts based on the multidimensional multivariate dataset, the system 102 provides the user with a variety of options for modifying the charts through an easy to use interface. Details of such options are described below.

In an example, the report generator 210 is configured to provide at least two filters with each of the one or more charts. In said example, a first filter provides a list of one or more components of the chart for redesigning the chart. For instance, the one or more components may include primary X-axis, primary Y-axis, stack dimension, change chart type, and the like. Furthermore, a second filter provides the individual with one or more options to modify a component selected by the user. For instance, the user may select change chart type using the first filter. Now, the second filter may provide options such as area chart, horizontal bars for a column chart, and the like.

In a further example, the report generator 210 may provide the individual with an option to select advanced filters. The advanced filters provide the individual with more options to redesign and modify the chart based on various attributes related to the chart.

In an example, when a component of a chart is indicative of one or more variables, where the one or more variables is indicative of ordinal text, the data analyzer 208 is configured to identify an order of the ordinal text and store it as predefined order in the data 206. A variable indicating ordinal text is one in which all items have the same text suffixed by an integer, and the integer part displays an order. For instance, Week 1, Week 2, Week 3, and so on and so forth. In the aforementioned example, when such variables are presented in the analysis report in a chart, the report generator 210 configures the component representing the variables based on a predefined order of the ordinal text. As an example, as shown in Table 2 below, the multidimensional multivariate dataset may include data related to sales of a product over different weeks. Such dataset is frequent in unorganized data like in excel sheets. In such an example, the data analyzer 208 may identify the order of the weeks based on integer part and the report generator 210 may configure the component of the chart based on the predefined order.

TABLE 2

| Week | Product | Sales |
|---|---|---|
| Week 5 | abc | 38.0 |
| Week 6 | abc | 37.0 |
| Week 6 | XYZ | 35.0 |
| Week 4 | abc | 33.0 |
| Week 3 | XYZ | 20.0 |
| Week 2 | abc | 16.0 |
| Week 2 | XYZ | 15.0 |
| Week 1 | abc | 12.0 |
| Week 1 | XYZ | 10.0 |
| Week 7 | XYZ | 14.0 |
| Week 8 | XYZ | 15.0 |
| Week 9 | XYZ | 11.0 |
| Week 10 | XYZ | 13.0 |
| Week 11 | XYZ | 15.0 |

Furthermore, in an example, the report generator 210 may provide with selection filters (from field and to field) for the analysis report based on which the individual may select to view charts based on data between specific ordinal texts. For instance, the individual may choose to view data from week 2 to week 6.

In an example, when a component of a chart is indicative of one or more variables, the data analyzer 208 is configured to ascertain whether the one or more variables are indicative of non-uniform time instances, for example, non-uniform dates. As for example, Dates in Table 3 are uniform time instances where difference between two dates is always one day, while supply dates in table 4 are non-uniform time instances where difference between two consecutive values are non-uniform. If the variables are indicative of non-uniform time instances, the data analyzer 208 is configured to aggregate the non-uniform time instances and determine a uniform time interval based on the aggregation. Subsequently, when the chart is prepared, the report generator 210 provides the individual with an option to modify the component based on the uniform time interval.

TABLE 3

| Date | Stock Price |
|---|---|
| 1 Jan. 2018 | 101 |
| 2 Jan. 2018 | 101.5 |
| 3 Jan. 2018 | 102 |
| 4 Jan. 2018 | 102.5 |
| 5 Jan. 2018 | 103 |
| 5 Jan. 2018 | 103.5 |
| 7 Jan. 2018 | 104 |

TABLE 4

| Date | Stock Price |
|---|---|
| 1 Jan. 2018 | 101 |
| 15 Jan. 2018 | 101.5 |
| 19 Jan. 2018 | 102 |
| 1 Feb. 2018 | 102.5 |
| 5 Feb. 2018 | 103 |
| 16 Feb. 2018 | 103.5 |
| 27 Feb. 2018 | 104 |

The differentiation between uniform vs non-uniform time instances, as done by the data analyzer 208, is imperative. As is known, the uniform time instances can be used as an axis of a chart as it. Whereas, the non-uniform time instances should not be used as an axis of a chart. According to aspects of the present subject matter, filters for non-uniform time instances so that user can drill down data for specific date range. However, if user want this variable to be an axis, as mentioned above, the data analyzer 208 determines appropriate interval of these dates like month, year etc and uses this determined interval as the axis as it is more informative.

In an example, when the analysis report comprises one or more charts corresponding to one or more hierarchical associations, the report generator 210 is configured to provide at least one filter with respect to the analysis report. The at least one filter provides a list of attributes related to the one or more hierarchical associations. As an example, the analysis report may include charts representing sales of different brands for different regions and areas. In such a case the filter may provide the individual with an option of selecting the region as a filter. The report generator 210 is further configured to receive a user input indicative of a selection of an attribute from the list of attributes. Based on the selected attribute, the report generator 210 is configured to modify a component of each of the one or more charts.

Continuing with the above example, when X-axis of a chart is non-hierarchical, say, brand, the hierarchical attribute works as a filter. That is, sales of the brands are filtered based on the region. In another case, when the X-axis of a chart is same attribute, i.e., Region, the X-axis of chart automatically adjusts to lower hierarchy of region, i.e., area.

As may be gathered from above, the system 102 provides for automatic determination of associations, automatic selection of charts, and a plurality of user friendly options to modify the charts. Thus, overall process of preparing charts for a multidimensional multivariate dataset is simplified. Also, overall time associated with preparation of charts is reduced greatly owing to the automatic determination of associations and automatic selection of the charts.

Figure 3:
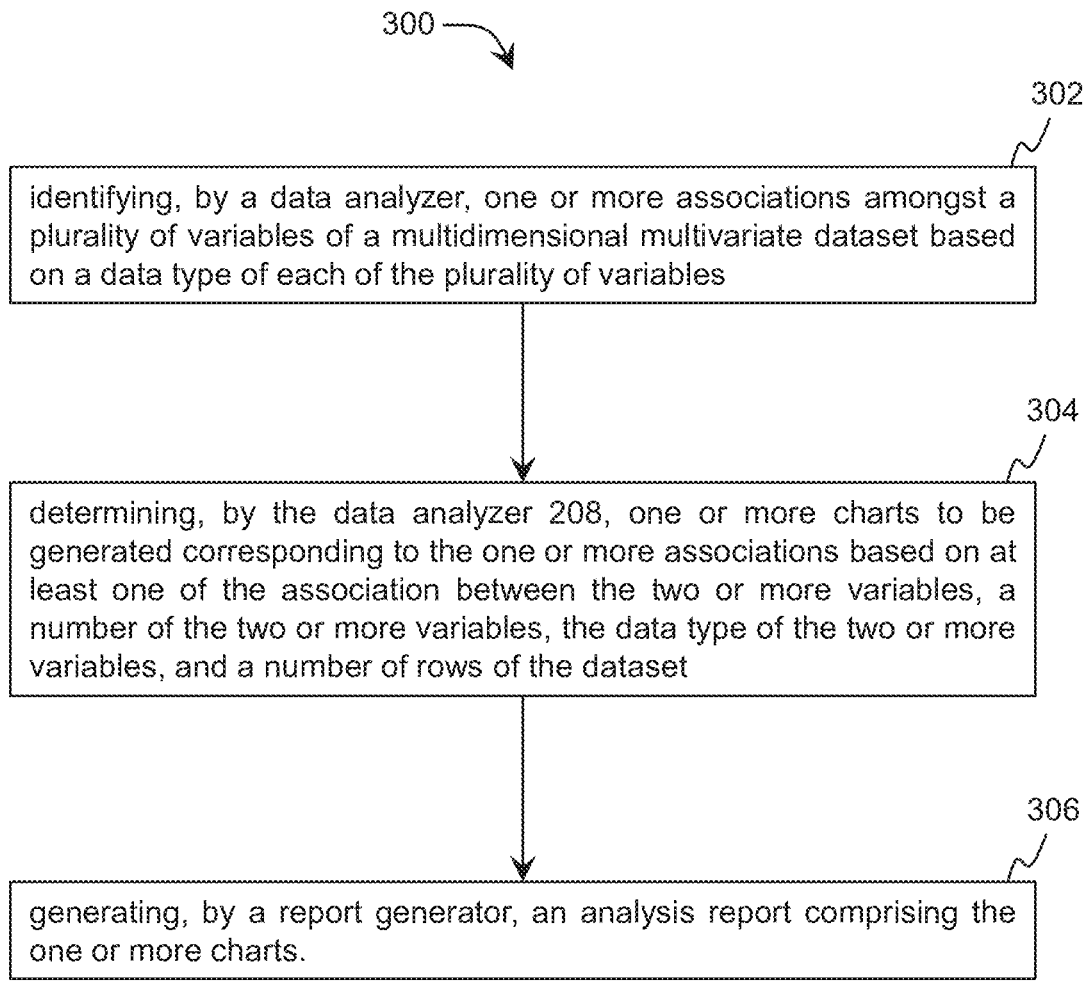
FIG. 3 illustrates a method of automatic selection of visualizations representing data based on data analysis, according to an embodiment of the present subject matter.

FIG. 3 illustrates a computer implemented method 300, hereinafter "method 300", of automatic selection of visualizations representing data based on data analysis. The method 300 may be implemented in the computing device 104 using components thereof, as described above. Further, for the sake of brevity, details of the present subject matter that are explained in detail with reference to description of FIGS. 1 and 2 above are not explained in detail herein.

At step 302, the method 300 includes identifying, by the data analyzer 208, one or more associations amongst a plurality of variables of a multidimensional multivariate dataset based on a data type of each of the plurality of variables. In an example, the associations may be one of a numerical association and a hierarchical association. Furthermore, the data type may be one of an attribute and a measure.

At step 304, the method 300 includes determining, by the data analyzer 208, one or more charts to be generated corresponding to the one or more associations based on at least one of the association between the two or more variables, a number of the two or more variables, the data type of the two or more variables, and a number of rows of the dataset.

As mentioned above, at least one of the aforementioned parameters may be chosen. Thus, there may be some datasets where not a single association is found. In such cases, the one or more charts to be generated corresponding to the one or more associations are selected based on at least one of the number of the two or more variables, the data type of the two or more variables, and the number of rows of the dataset.

As an example, a numerical association may be identified between three variables, say, target sales of a region, actual sales of region, and percentage accomplishment of sales, each having data type measure. In said example, it may be identified that the association type is "numerical", number of variables is "3", and the data type of variables is "measure". Furthermore, the number of rows of the dataset may also be determined. Based on aforesaid identifications and determination, a bubble chart may be selected to represent the association between the three variables.

At step 306, the method 300 includes generating, by a report generator, an analysis report comprising the one or more charts. In an example, an order of the charts in the analysis report may be determined based on predefined rules. Furthermore, the analysis report may provide at least two filters with each of the charts as explained above. Furthermore, at least one filter may be provided in respect of the analysis report. By providing such filters, various modifications to the charts may be performed by the individual with ease.

Figure 4:
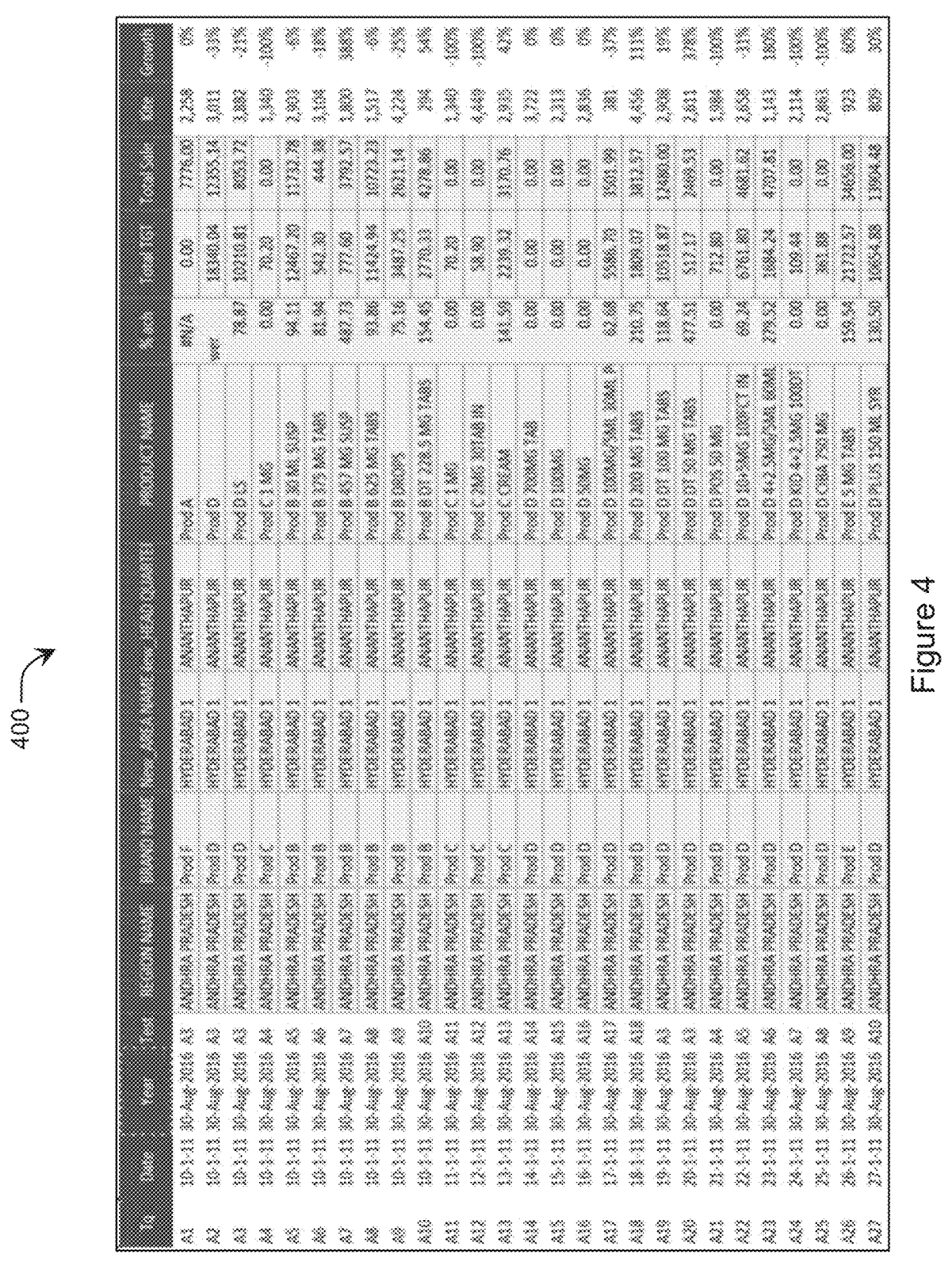

FIG. 4 illustrates a sample multidimensional multivariate dataset 400 representing sales data of different products for different regions over various time periods. According to aspects of the present subject matter, the system 102 may be implemented for automatically determining associations between the variables of the dataset 400 and automatically selecting various charts based on the associations. Various example charts 500-522, selected and generated based on the associations found in the multidimensional multivariate dataset 400 are depicted in FIGS. 5(a) to 5(f).

Figure 5A:
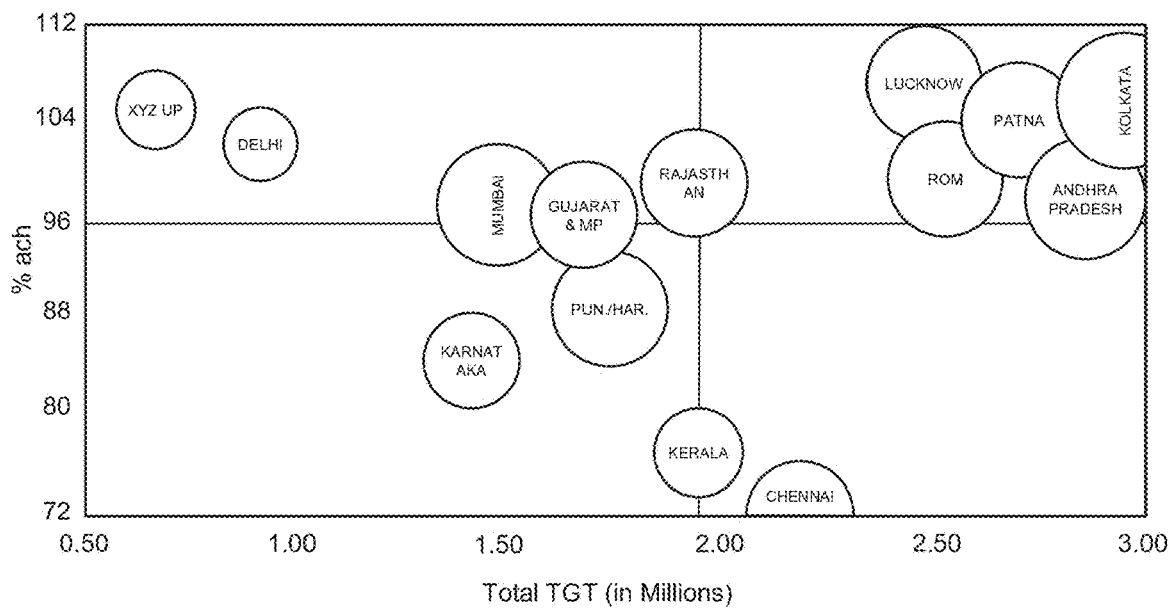
FIGS. 5(a)-5(j) illustrate example charts generated based on the example multidimensional multivariate dataset, according to an embodiment of the present subject matter.
Figure 5B:
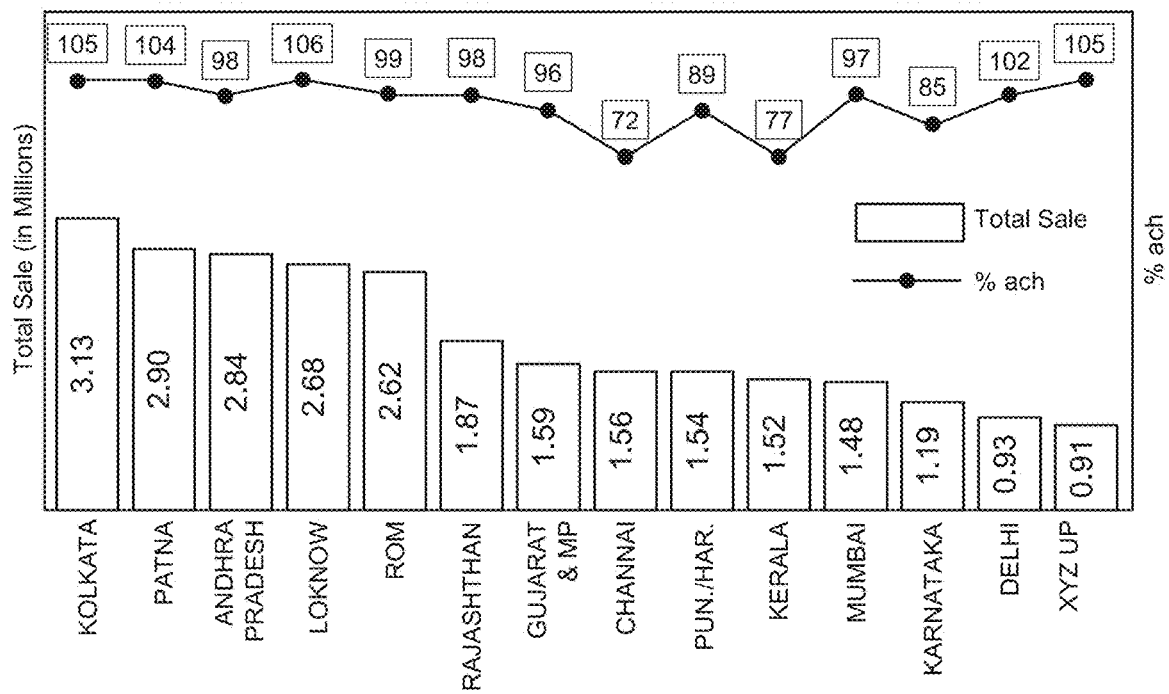

Referring to FIG. 5(a), Chart 500 depicts a bubble chart. The chart 500 illustrates three measures, preferably related, of an attribute in one chart. As shown in the FIG. 5(a), three measures, i.e., Sales, Target and achievement of one attribute, i.e., Regions are shown as size of bubble, X-Axis, and Y-Axis, respectively. Referring to FIG. 5(b), Chart 502 is combination chart of column and line. Column and line represent two different measures of a selected attribute.

Figure 5C:
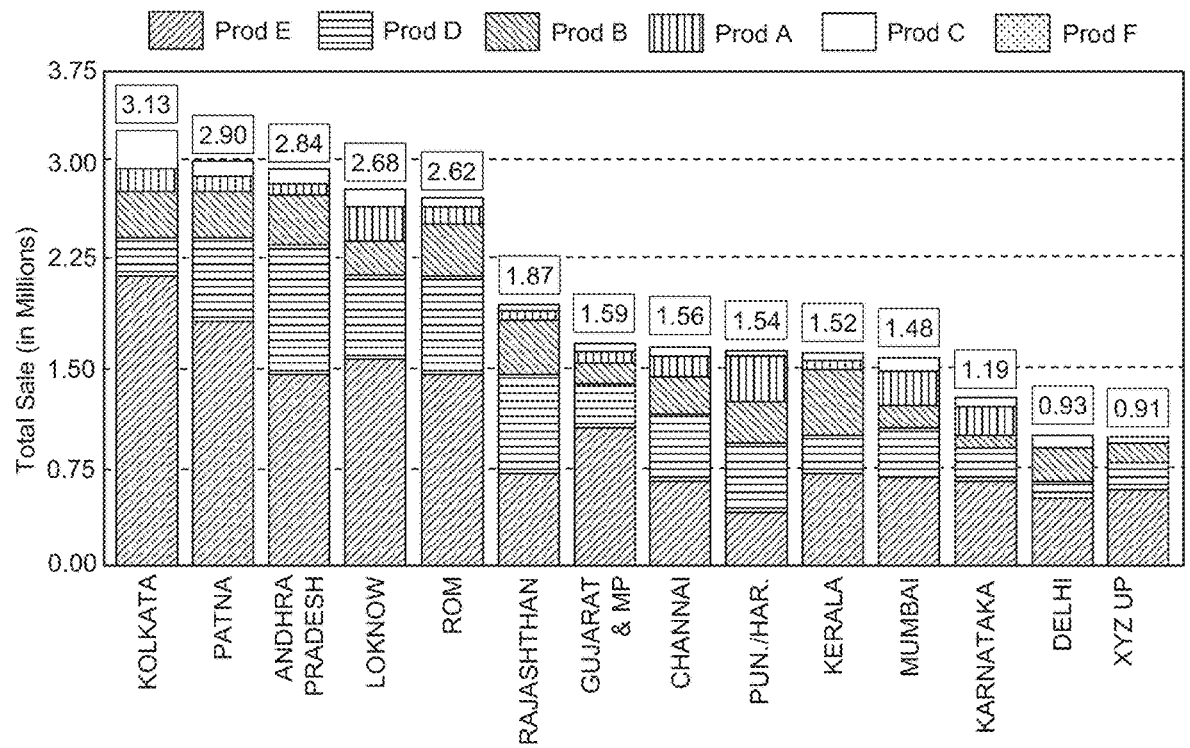
Figure 5D:
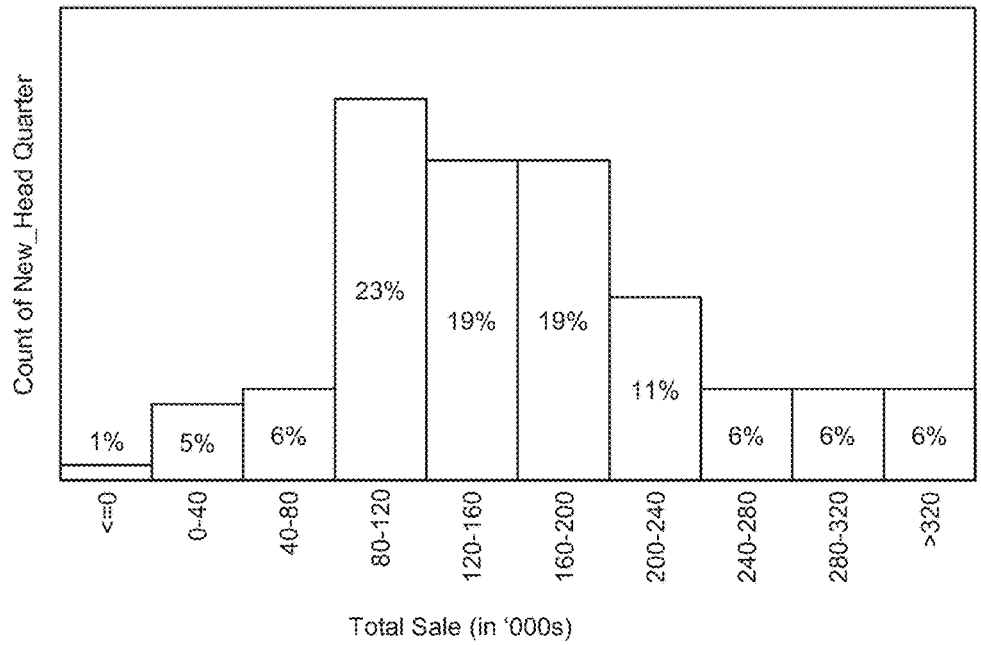

Referring to FIG. 5(c), Chart 504 is a stack chart which depicts break up of a measure for an attribute along another attribute. The present chart shows how sales of each region is composed of different brands. Referring to FIG. 5(d), Chart 506 is a histogram which shows how sales of headquarters are distributed among different buckets of sales.

Figure 5E:
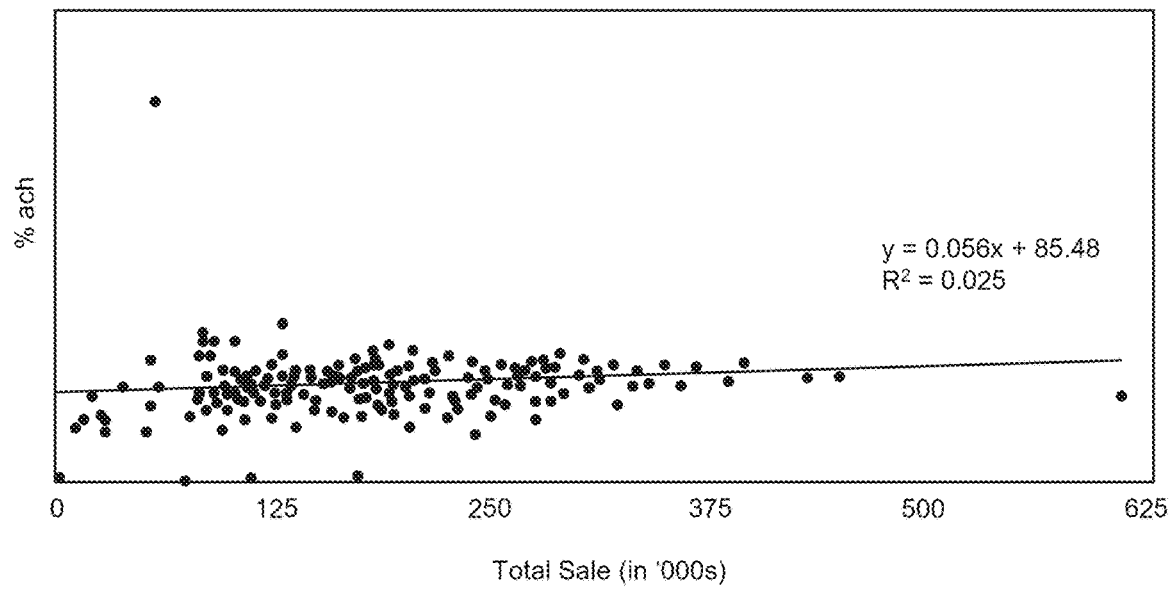
Figure 5F:
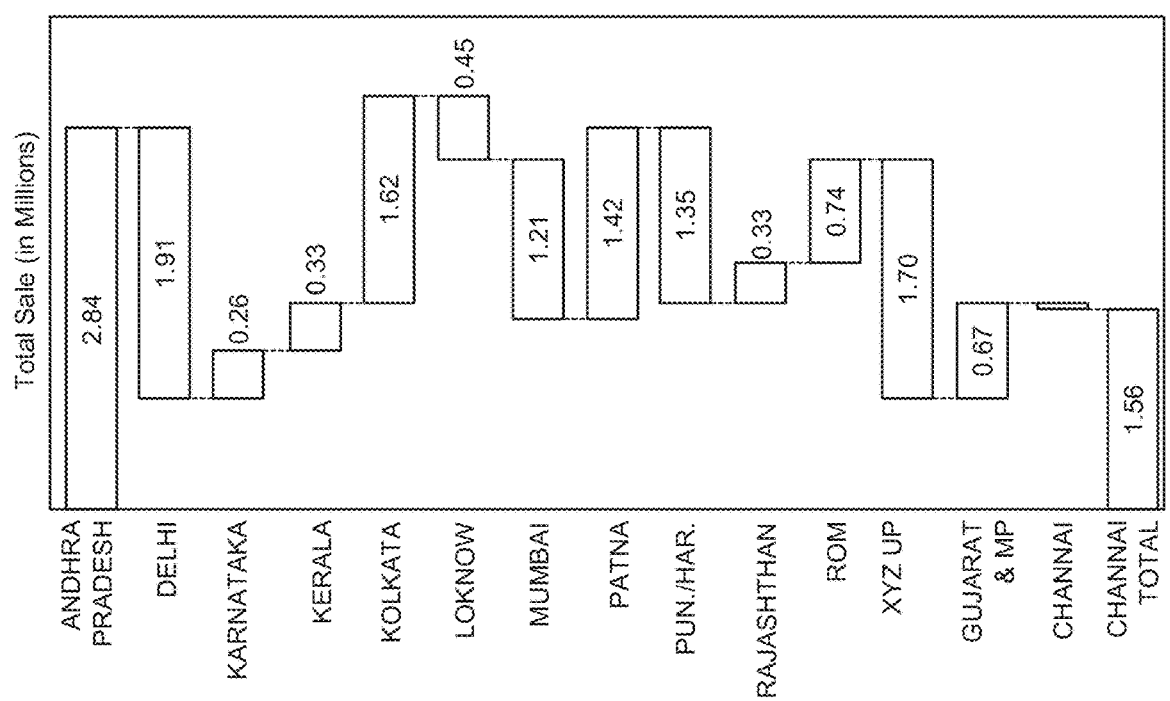

Referring to FIG. 5(e), Chart 508 is a scatter plot visualizing relationship between two measures of an attribute. Referring to FIG. 5(f), Chart 510 is a waterfall chart which depicts evolution of successive elements of a variable with respect to previous one.

Figure 5G:
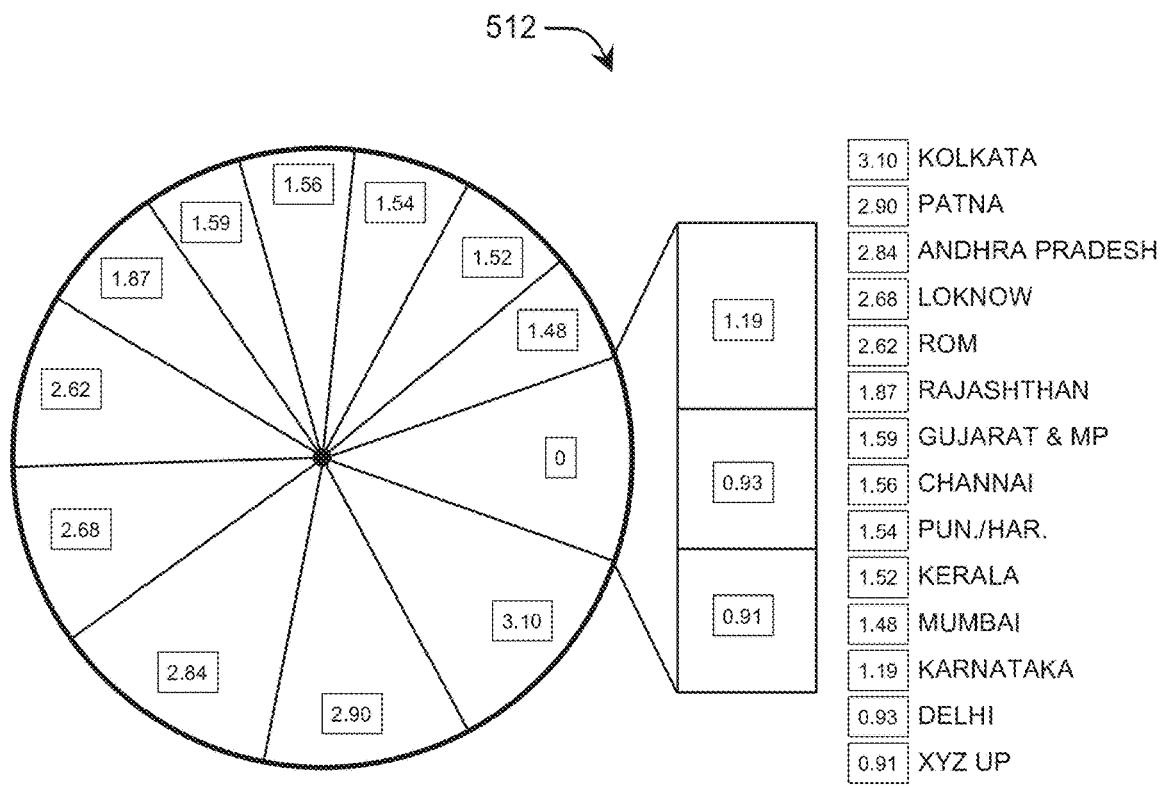
Figure 5H:
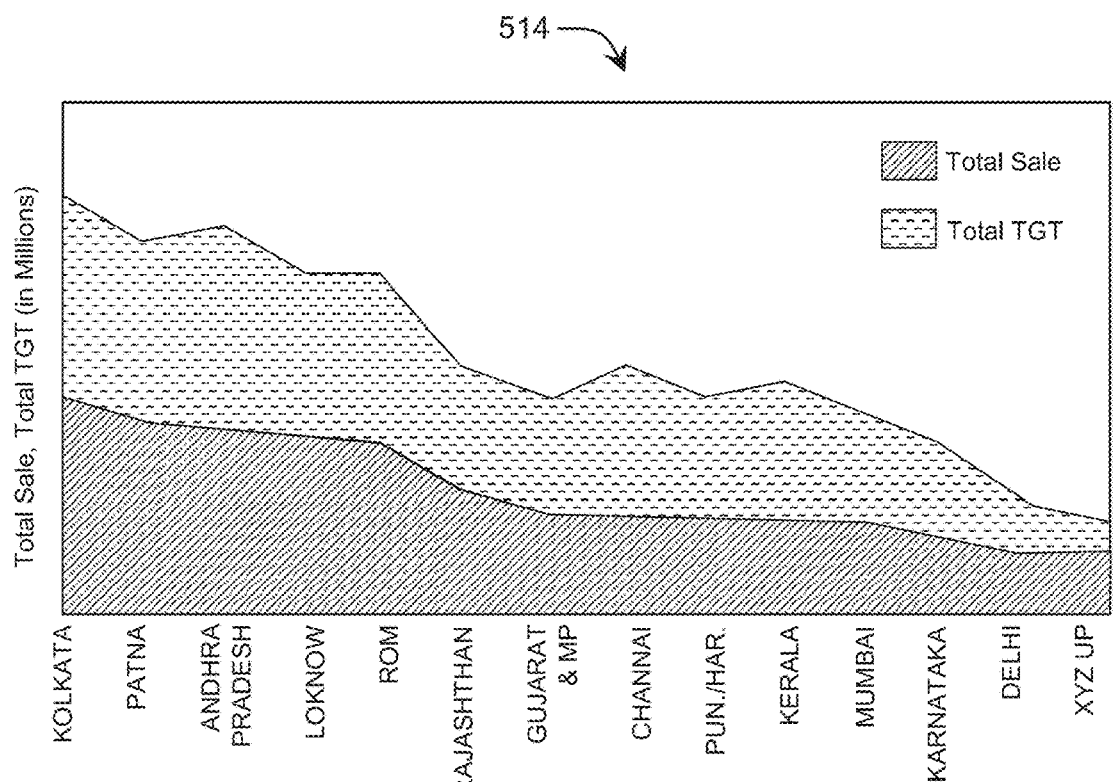

Referring to FIG. 5(g), Chart 512 is a pie chart which visually depict contribution of each element of a variable in total sum of that variable. Referring to FIG. 5(h), Chart 514 is an area-stack chart, similar to chart 504, however chart is presented as continuous area instead of columns.

Figure 5I:
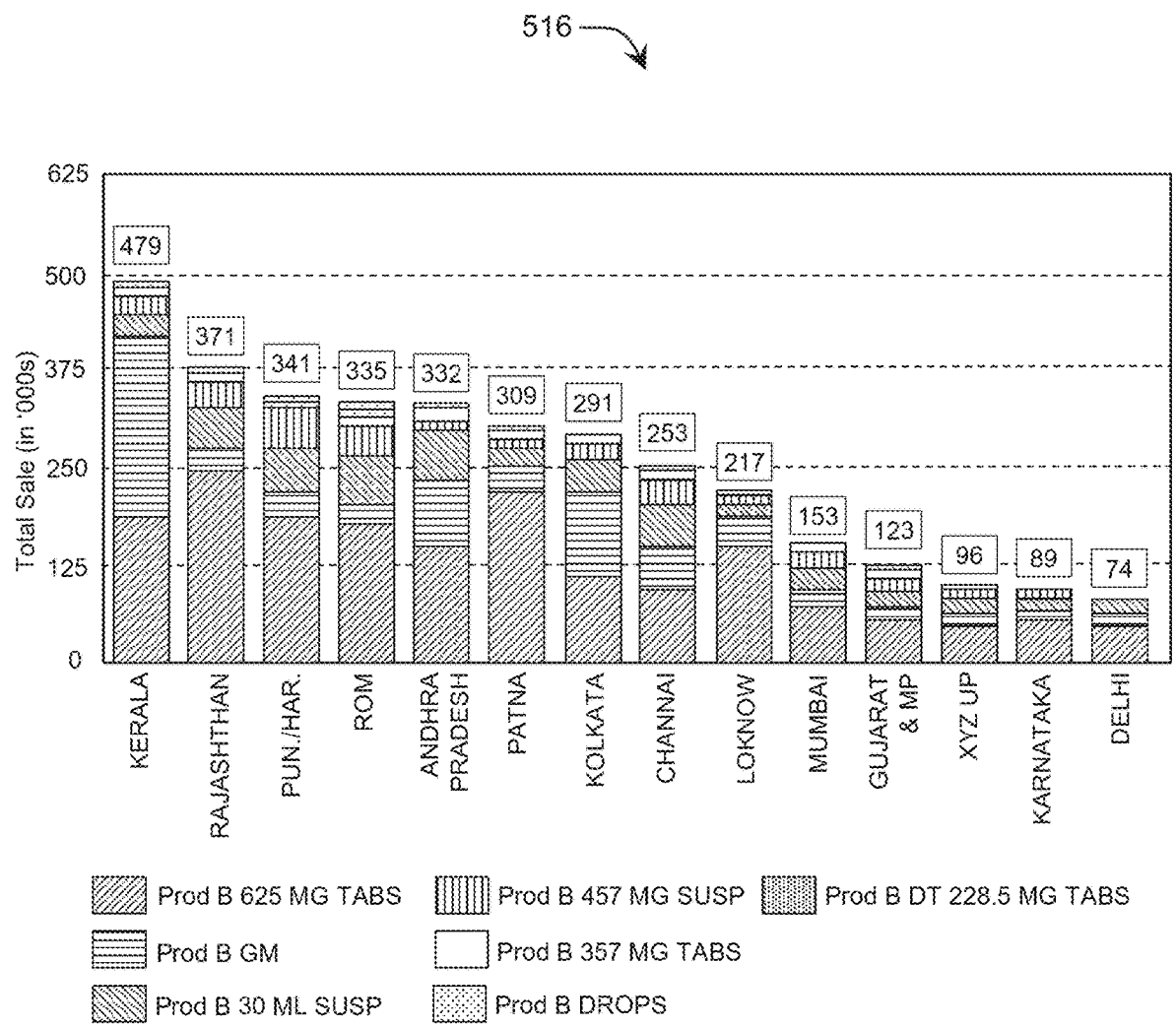
Figure 5J:
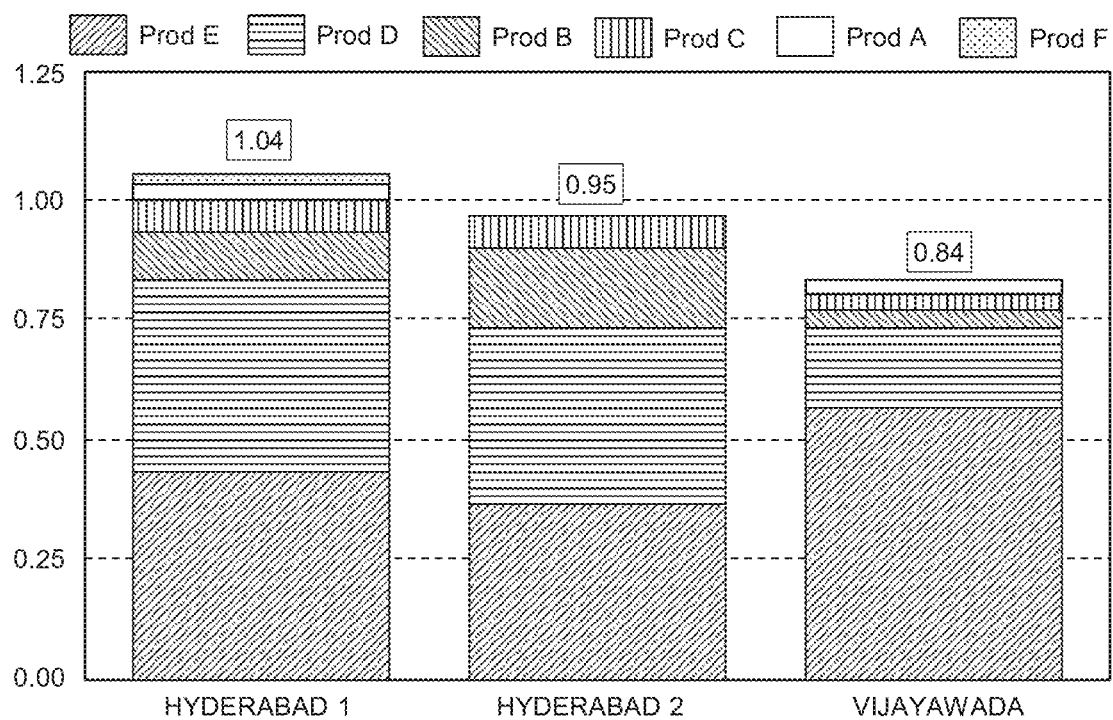

Referring to FIG. 5(i), a chart 516, according to an embodiment of the present subject matter. As shown in the figure, the chart 516 corresponds to the multidimensional multivariate dataset 400, as shown in FIG. 4. In the chart 516, the stack chart has Region as X-axis. In an example, if a user selects Andhra Pradesh region using a filter, the X-Axis of chart automatically adjusts to Area within Andhra Pradesh, as shown in chart 518 of FIG. 5(j).

As mentioned above, all the charts 516-518 are generated in a single analysis report in one go. Furthermore, the user may use one or more filters, both at chart level and at analysis report level for filtering the data and/or for redesigning the charts.

While specific language has been used to describe the present subject matter, any limitations arising on account thereto, are not intended. As would be apparent to a person in the art, various working modifications may be made to the method in order to implement the inventive concept as taught herein. The drawings and the foregoing description give examples of embodiments. Those skilled in the art will appreciate that one or more of the described elements may well be combined into a single functional element. Alternatively, certain elements may be split into multiple functional elements. Elements from one embodiment may be added to another embodiment.

I claim:

1. A computer-implemented method comprising:
identifying, by a data analyzer, one or more associations amongst a plurality of variables of a multidimensional multivariate dataset based on a data type of each of the plurality of variables, wherein the data type is one of an attribute and a measure, wherein the attribute is non-measurable descriptive data and the measure is quantifiable data, wherein each association is between two or more variables, wherein an association is one of a numerical association when the data type of the two or more variables is measure and a hierarchical association when the data type of the two or more variables is attribute, wherein at least one numerical association and at least one hierarchical association is identified in the multidimensional multivariate dataset, and wherein at least one variable in the numerical association is a non-aggregatable measure;
determining, by the data analyzer, the non-aggregatable measure in respect of an upper hierarchical variable of the at least one hierarchical association based on other variables of the at least one numerical association;

selecting, by the data analyzer, one or more charts to be generated corresponding to the one or more associations based on at least one of:
  a) the association between the two or more variables;
  b) a number of the two or more variables;
  c) the data type of the two or more variables; and
  d) a number of rows of the dataset; and
generating, by a report generator, an analysis report comprising the one or more charts.

2. The computer-implemented method as claimed in claim 1, wherein the method further comprises determining an order of presentation of the one or more charts in the analysis report based on a predefined set of rules.

3. The computer-implemented method as claimed in claim 1, wherein the method further comprises providing at least two filters with each of the one or more charts, wherein a first filter provides a list of one or more components of the chart, and wherein a second filter provides the user with one or more options to modify a component selected by the user.

4. The computer-implemented method as claimed in claim 1, wherein a component of a chart is indicative of one or more variables, wherein the one or more variables is indicative of ordinal text, wherein the method further comprises configuring the component of the chart based on a predefined order of the ordinal text.

5. The computer-implemented method as claimed in claim 1, wherein a component of a chart is indicative of one or more variables, wherein the method further comprises:
  ascertaining whether the one or more variables are indicative of non-uniform time instances;
  aggregating the non-uniform time instances based on the ascertaining;
  determining a uniform time interval based on the aggregation; and
  providing a user with an option to modify the component based on the uniform time interval.

6. The computer-implemented method as claimed in claim 1, wherein a variable is indicative of an integer, wherein the method further comprises:
  ascertaining whether a data type of the variable is one of the attribute or the measure; and
  performing, based on the ascertaining, one of:
    converting the integer to a date when the data type of the variable is ascertained to be the attribute and the integer is indicative of an year; and
    converting the integer to a text when the data type of the variable is ascertained to be the attribute and the integer is indicative of a unique identity; and
    an operation based on the integer when the data type of the variable is ascertained to be the measure.

7. The computer-implemented method as claimed in claim 1, wherein a plurality of data entries related to a variable are indicative of text, wherein the method further comprises:
  ascertaining whether the plurality of data entries is indicative of time instances;
  determining a format of the time instances based on an analysis of the plurality of data entries; and
  converting a format of the plurality of data entries to the determined format.

8. The computer implemented method as claimed in claim 1, wherein the analysis report comprises one or more charts corresponding to one or more hierarchical associations, wherein the method further comprises:
  providing at least one filter with respect to the analysis report, wherein the at least one filter provides a list of attributes related to the one or more hierarchical associations;
  receiving a user input indicative of a selection of an attribute from the list of attributes; and
  modifying a component of each of the one or more charts based on the selected attribute.

9. A system comprising:
  a data analyzer configured to:
    identify one or more associations amongst a plurality of variables of a multidimensional multivariate dataset based on a data type of each of the plurality of variables, wherein the data type is one of an attribute and a measure, wherein the attribute is non-measurable descriptive data and the measure is quantifiable data, wherein each association is between two or more variables, wherein an association is one of a numerical association when the data type of the two or more variables is measure and a hierarchical association when the data type of the two or more variables is attribute, wherein at least one numerical association and at least one hierarchical association is identified in the multidimensional multivariate dataset, and wherein at least one variable in the numerical association is a non-aggregatable measure;
    determine the non-aggregatable measure in respect of an upper hierarchical variable of the at least one hierarchical association based on other variables of the at least one numerical association; and
    select, one or more charts to be generated corresponding to the one or more associations based on at least one of:
      a) the association between the two or more variables;
      b) a number of the two or more variables;
      c) the data type of the two or more variables; and
      d) a number of rows of the dataset; and
  a report generator configured to generate an analysis report comprising the one or more charts.

10. The system as claimed in claim 9, wherein the report generator is further configured to determine an order of presentation of the one or more charts in the analysis report based on a predefined set of rules.

11. The system as claimed in claim 9, wherein the report generator is further configured to provide at least two filters with each of the one or more charts, wherein a first filter provides a list of one or more components of the chart, and wherein a second filter provides the user with one or more options to modify a component selected by the user.

12. The system as claimed in claim 9, wherein a component of a chart is indicative of one or more variables, wherein the one or more variables is indicative of ordinal text, wherein the report generator is further configured to configure the component of the chart based on a predefined order of the ordinal text.

13. The system as claimed in claim 9, wherein a component of a chart is indicative of one or more variables, wherein:
  the data analyzer is further configured to:
    ascertain whether the one or more variables are indicative of non-uniform time instances;
    aggregate the non-uniform time instances based on the ascertaining; and
    determine a uniform time interval based on the aggregation; and
  the report generator is configured to provide a user with an option to modify the component based on the uniform time interval.

14. The system as claimed in claim 9, wherein a variable is indicative of an integer, wherein the data analyzer is further configured to:
    ascertain whether a data type of the variable is one of the attribute or the measure; and
    perform, based on the ascertaining, one of:
        convert the integer to a date when the data type of the variable is ascertained to be the attribute and the integer is indicative of an year; and
        convert the integer to a text when the data type of the variable is ascertained to be the attribute and the integer is indicative of a unique identity; and
        an operation based on the integer when the data type of the variable is ascertained to be the measure.

15. The system as claimed in claim 9, wherein a plurality of data entries related to a variable are indicative of text, wherein the data analyzer is further configured to:
    ascertain whether the plurality of data entries is indicative of time instances;
    determine a format of the time instances based on an analysis of the plurality of data entries; and
    convert a format of the plurality of data entries to the determined format.

16. The system as claimed in claim 9, wherein the analysis report comprises one or more charts corresponding to one or more hierarchical associations, wherein the report generator is further configured to:
    provide at least one filter with respect to the analysis report, wherein the at least one filter provides a list of attributes related to the one or more hierarchical associations;
    receive a user input indicative of a selection of an attribute from the list of attributes; and
    modify a component of each of the one or more charts based on the selected attribute.

17. A non-transitory computer-readable medium having embodied thereon a computer program for executing a method implementable by a computing device, the method comprising:

identifying, by a data analyzer, one or more associations amongst a plurality of variables of a multidimensional multivariate dataset based on a data type of each of the plurality of variables, wherein the data type is one of an attribute and a measure, wherein the attribute is non-measurable descriptive data and the measure is quantifiable data, wherein each association is between two or more variables, wherein an association is one of a numerical association when the data type of the two or more variables is measure and a hierarchical association when the data type of the two or more variables is attribute, wherein at least one numerical association and at least one hierarchical association is identified in the multidimensional multivariate dataset, and wherein at least one variable in the numerical association is a non-aggregatable measure;

determining, by the data analyzer, the non-aggregatable measure in respect of an upper hierarchical variable of the at least one hierarchical association based on other variables of the at least one numerical association;

selecting, by the data analyzer, one or more charts to be generated corresponding to the one or more associations based on at least one of:
        e) the association between the two or more variables;
        f) a number of the two or more variables;
        g) the data type of the two or more variables; and
        h) a number of rows of the dataset; and generating, by a report generator, an analysis report comprising the one or more charts.

18. The non-transitory computer-readable medium as claimed in claim 17, wherein the method further comprises determining an order of presentation of the one or more charts in the analysis report based on a predefined set of rules.

* * * * *